United States Patent
Kyles et al.

(10) Patent No.: US 12,307,944 B2
(45) Date of Patent: May 20, 2025

(54) SYSTEMS AND METHODS OF DRIVING A DISPLAY WITH HIGH BIT DEPTH

(71) Applicant: Snap Inc., Santa Monica, CA (US)

(72) Inventors: Ian Kyles, West Linn, OR (US); Nicholas William Melena, Phoenix, AZ (US); Edmund Passon, Scottsdale, AZ (US); Joshua T. Wiersma, Phoenix, AZ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/583,287

(22) Filed: Feb. 21, 2024

(65) Prior Publication Data
US 2024/0194120 A1  Jun. 13, 2024

Related U.S. Application Data

(63) Continuation of application No. 17/791,153, filed as application No. PCT/US2021/012472 on Jan. 7, 2021, now Pat. No. 11,984,061.
(Continued)

(51) Int. Cl.
G09G 3/20 (2006.01)
G09G 3/32 (2016.01)
G09G 3/36 (2006.01)

(52) U.S. Cl.
CPC ......... *G09G 3/2096* (2013.01); *G09G 3/2007* (2013.01); *G09G 3/32* (2013.01);
(Continued)

(58) Field of Classification Search
CPC ................................................ G09G 2310/06
See application file for complete search history.

(56) References Cited

U.S. PATENT DOCUMENTS 11,984,061 B2  5/2024  Kyles et al.
2004/0263502 A1  12/2004  Dallas et al.
(Continued)

FOREIGN PATENT DOCUMENTS

CN  104008715 A  8/2014
CN  106652963 A  5/2017
(Continued)

OTHER PUBLICATIONS

"U.S. Appl. No. 17/791,153, Examiner Interview Summary mailed Oct. 23, 2023", 2 pgs.
(Continued)

*Primary Examiner* — Gustavo Polo
(74) *Attorney, Agent, or Firm* — Schwegman Lundberg & Woessner, P.A.

(57) ABSTRACT

Systems and methods for varying an intensity of pixels of displays are provided. A display subsystem may include a display driver for receiving image frame data and commands from an image or data source, including pixel intensity values for bit planes of an image frame; a parser for receiving the image frame data and the commands, and configured to determine a drive waveform having an pixel drive value and a pixel drive time interval for each bit plane of the image frame data; a display backplane for receiving the drive waveform, the display backplane including a pixel array comprising an array of pixels, each pixel driven by a pixel circuit; and display driver circuitry for driving the pixels in accordance with the drive waveform; and wherein an intensity of the pixel varies for each bit plane according to the pixel drive value and the pixel drive time interval.

20 Claims, 4 Drawing Sheets

Related U.S. Application Data

(60) Provisional application No. 62/958,019, filed on Jan. 7, 2020.

(52) U.S. Cl.
CPC ....... *G09G 3/3611* (2013.01); *G09G 2310/06* (2013.01); *G09G 2310/08* (2013.01); *G09G 2370/00* (2013.01)

(56) References Cited

U.S. PATENT DOCUMENTS

| | | |
|---|---|---|
| 2011/0216078 A1 | 9/2011 | Blinzer |
| 2018/0075808 A1 | 3/2018 | Yamashita et al. |
| 2019/0147814 A1 | 5/2019 | Li et al. |
| 2019/0251893 A1 | 8/2019 | Martin et al. |
| 2021/0210046 A1* | 7/2021 | Iverson ................ G06F 3/013 |
| 2023/0022217 A1 | 1/2023 | Kyles et al. |

FOREIGN PATENT DOCUMENTS

| | | |
|---|---|---|
| CN | 109643370 A | 4/2019 |
| CN | 110520921 A | 11/2019 |
| CN | 115104143 A | 9/2022 |
| KR | 20100081533 A | 7/2010 |
| TW | 202144992 A | 12/2021 |
| TW | 1840644 B | 5/2024 |
| WO | WO-2018237366 A1 | 12/2018 |
| WO | WO-2019226927 A1 | 11/2019 |
| WO | WO-2021142099 A1 | 7/2021 |

OTHER PUBLICATIONS

"U.S. Appl. No. 17/791,153, Non Final Office Action mailed Sep. 6, 2023", 6 pgs.

"U.S. Appl. No. 17/791,153, Notice of Allowance mailed Dec. 6, 2023", 8 pgs.

"U.S. Appl. No. 17/791,153, Preliminary Amendment Filed Dec. 16, 2022", 7 pgs.

"U.S. Appl. No. 17/791,153, Response filed Oct. 27, 2023 to Non Final Office Action mailed Sep. 6, 2023", 8 pgs.

"U.S. Appl. No. 17/791,153, Supplemental Amendment & Response Under 37 C.F.R. § 1.111", 9 pgs.

"International Application Serial No. PCT/US2021/012472, International Preliminary Report on Patentability mailed Jul. 21, 2022", 13 pgs.

"International Application Serial No. PCT/US2021/012472, International Search Report mailed Apr. 26, 2021", 4 pgs.

"International Application Serial No. PCT/US2021/012472, Written Opinion mailed Apr. 26, 2021", 11 pgs.

"Korean Application Serial No. 10-2022-7027162, Office Action mailed Aug. 9, 2022", W/O English Translation, 2 pgs.

"U.S. Appl. No. 17/791,153, Corrected Notice of Allowability mailed Apr. 12, 2024", 2 pgs.

"Chinese Application Serial No. 202180008196.7, Office Action mailed Nov. 15, 2024", W/English Translation, 18 pgs.

"Korean Application Serial No. 10-2022-7027162, Final Office Action mailed Oct. 2, 2024", W/English Translation, 7 pgs.

"Korean Application Serial No. 10-2022-7027162, Office Action mailed Feb. 15, 2024", w/English Claims, 29 pgs.

"Korean Application Serial No. 10-2022-7027162, Office Action mailed Feb. 15, 2024", w/English translation, 21 pgs.

"Korean Application Serial No. 10-2022-7027162, Response Filed Jan. 2, 2025 to Final Office Action mailed Oct. 2, 2024", w/ English Claims, 20 pgs.

"Chinese Application Serial No. 202180008196.7, Response filed Mar. 4, 2025 to Office Action mailed Nov. 15, 2024", w/ English Claims, 13 pgs.

"European Application Serial No. 21705665.4, Response to Communication Pursuant to Rules 161 and 162 EPC Filed Feb. 16, 2023", 10 pgs.

"European Application Serial No. 21705665.4, Communication Pursuant to Article 94(3) EPC mailed Feb. 10, 2025", 7 pgs.

\* cited by examiner

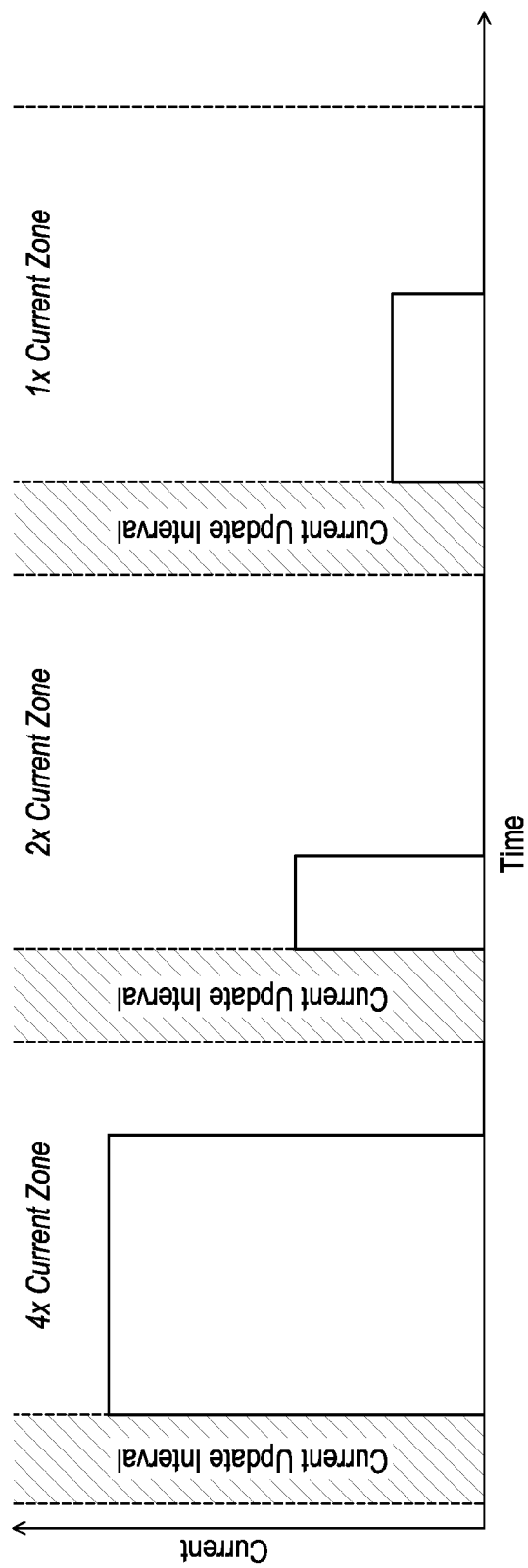

SYSTEMS AND METHODS OF DRIVING A DISPLAY WITH HIGH BIT DEPTH

RELATED APPLICATIONS

This application is a continuation of U.S. application Ser. No. 17/791,153, filed Jul. 6, 2022, which application is a U.S. National Stage Filing under 35 U.S.C. 371 from International Application No. PCT/US2021/012472, filed on 7 Jan. 2021, and published as WO 2021/142099 on 15 Jul. 2021, which application claims the benefit of U.S. Provisional Application No. 62/958,019, filed on Jan. 7, 2020. The entire content of which is incorporated herein by reference.

FIELD OF THE DISCLOSURE

The present disclosure relates to display systems. More particularly, the disclosure relates to display systems and methods for varying an intensity of pixels of displays. Exemplary displays may include LED displays, for example microLED displays that modulates the light emission of LEDs or microLEDs using a method that combines temporal and magnitude (level) modulation of LEDs.

BACKGROUND OF THE DISCLOSURE

Conventional micro-LED backplanes are either digital voltage drive type or analog voltage drive type. A drive scheme seeks to translate a digital grayscale (relative brightness) value for each pixel in an image into an amount of light emitted or reflected from each pixel of the display during each frame of video to be displayed. Digital voltage drive types typically have a fixed voltage or current for all bit-planes or time intervals within a frame, and the intensity of the pixel is varied by changing the fixed voltage or current level applied in a binary manner. Analog drive schemes provide a static analog voltage or current for the entire video frame, but analog drive displays are subject to inaccuracies, mismatches (non-uniformity) and drift of the drive value over the frame time.

A digital drive scheme is preferred for improved rendition of the grayscale value into pixel intensity on the display, however a digital drive scheme using only time and on/off states as variables to turn pixels on and off for bit-planes or time intervals within a frame to control the intensity (i.e. the apparent brightness) of the pixel for each frame imposes an unnecessary limitation. For example, in a typical digital drive scheme system, an 8-bit color depth implies at least 256 bit-planes, using, for instance a PWM scheme where a value of 1 corresponds to one bit-plane time high, and 255 bit-plane times low, and a using bit-plane load time of 50 us then implies a frame minimum time of 256×50 us=12.8 ms, or a frame rate of 1/12.8 ms=78.125 Hz. This process is without consideration for gamma-encoding, which would necessitate a larger number of bit planes to expand the grayscale data from a gamma-encoded value to a linear intensity value that is the equivalent of 12, 14 or 16 bits, and thus, need $2^{12}$ bit planes, under these circumstances, to properly represent the desired range of intensities.

The finite amount of time available to send bit planes to a display restricts the system from providing higher frame rates without a loss of color depth if only binary-weighted durations are used to represent the gray-scale levels (e.g., MSB takes 128 bit planes, MSB−1 takes 64 bit planes and so-on). When a PWM (pulse width modulation) method is used to represent different Gray-scale levels the pulse duration is proportional to the number of bit-plane times that have to be sent to a display to achieve the desired gray scale level, then the ability to get higher bit depth is restricted by the bit plane time and the number of those bit planes that can fit in the color sub-frame time.

Beyond compressing the time needed to represent the different intensity levels, it is also typical to be able to apply Gamma correction, which is a nonlinear operation, which when applied to an incoming gamma-encoded grayscale value, provides, for instance, a greater number of grayscale values as the intensity value of each gamma-encoded grayscale level is converted to grayscale values or levels that have a nonlinear relationship with the other grayscale values or levels, and thus requires a greater bit-depth to properly represent the value digitally. Providing Gamma correction is also more difficult to accomplish in display systems having smaller bit-depth and restrictions on number of bit planes within a frame time, as it is difficult to represent the intensity with the small number of time increments available. As a result, these systems require using some of the bit depth to map the incoming grayscale to its gamma-corrected value, and this results in either a reduction in bit-depth or a scarcity of time in which to place a sufficient number of bit planes to allow for accurate representation of the gamma-encoded value.

BRIEF SUMMARY OF THE DISCLOSURE

In an aspect of the present disclosure there is provided a display system for driving pixels of a pixel array, said display system comprising: a display subsystem for displaying images and executing commands from an image or video data source, said display subsystem comprising; display driver circuitry for receiving image frame data and commands from the image or data source, said image frame data comprising pixel intensity or brightness values for bit planes of an image frame or subframe; a parser for receiving the image frame data and the commands, and configured to determine a drive waveform having a pixel drive value and a pixel drive time interval for each bit plane of the image frame data; a display backplane for receiving the drive waveform, said display backplane comprising pixel driver circuitry for driving the pixels in accordance with the drive waveform; and wherein an intensity or brightness of the pixel varies for each bit plane according to the pixel drive value and the pixel drive time interval.

Embodiments of the disclosure combine the ability to change pixel drive currents (globally for the entire display) on the fly in the course of a frame, for example, a video frame, with a flexible sequence of bit planes of varying time duration that are used to compose pulses of varying width to give varying intensity levels. By adding the extra variable (such as current for LEDs, or voltage for LCoS) both time and current/voltage may be used to alter the intensity value represented by any grayscale value or any portion of the drive waveform by making each intensity level to be represented a sum of a series of time and current/voltage pairs.

Embodiments of the present disclosure may include: a) a display backplane IC containing a display array or matrix consisting or comprising of a plurality of drive pixel circuits, for example, current drive pixel circuits (which may typically include pixel logic gates and pixel drivers that incorporate a current source such as a transistor, for example a field effect transistor, to drive the LEDs (i.e., pixel elements)) coupled to said pixel circuits; b) drive sequence (which may reside in a Driver IC or on Driver logic co-located in a backplane IC that programs the global voltage bias DAC settings used to bias the current drivers in the pixels, that controls or is utilized to vary the drive current of the pixel drive circuits, such that the drive current provided to the pixel elements (e.g., microLEDs) by the pixel circuits, are updated on-the-fly (i.e., in real time) when the system accepts new global bias DAC settings multiple times (i.e. coincident with one or more bit planes) per video frame; c) a mechanism, for example, an SPI slave that outputs new binary value updates to the register controlling the Bias DAC by the system, such that the Bias DAC controls the global bias voltage for the current sources of the pixel array, from commands embedded with the image frame data (which can include video data); and d) a sequence memory that stores one or more programmable mappings that may vary according to desired performance or in response to environmental conditions such as ambient lighting and temperature (to provide temperature compensation), and that are utilized by the display driver logic to convert between input grayscale levels and a sequence of time-current pairs to be sent to the display backplane IC for each pixel over the course of a frame time to achieve the desired grayscale value.

In an embodiment of a system, in accordance with the present disclosure, a sequence generated by a piece of sequence-generation software, capable of creating and calibrating such sequences, may divide the available frame time into zones, where each zone uses a different current drive value, and uses a PWM waveform produced at each pixel drive circuit output for each zone, as shown in the figures. In an embodiment of a drive sequence (i.e. a collection of commands that maps grayscale values onto bit-plane values and timings, and current drive values) in accordance with embodiments of the present disclosure, a drive current to each pixel of a display or to at least a portion of the display can be changed for each pixel of the display, or portion of the display, at the same time based on one or more commands that are transmitted to the backplane IC containing the pixel driver circuitry along with or at the same time image data is transmitted to memory elements of the driver circuitry for the display. In an embodiment, the driver circuitry may be coupled to, included in, or integrated into the backplane of the display. In an embodiment of the present disclosure, the driver circuitry may or may not be integrated into or included into the backplane and may be electrically coupled to the display via one or more conducting elements.

According to a second aspect of the present disclosure, there is provided a method of operating a display system, said method comprising the steps of receiving image frame data and commands from an image or data source, said image frame data comprising pixel intensity values for bit planes of an image frame; parsing the image frame data and commands; determining a drive waveform having a pixel drive value and a pixel drive time interval for each bit plane of the image frame data; driving pixels in a pixel array in accordance with the drive waveform, wherein an intensity of the pixel varies for each bit plane according to the pixel drive value and the pixel drive time interval.

The embodiments of the present disclosure overcome the above-identified problems of conventional devices and methods as well as other shortcomings and deficiencies of existing technologies by providing a system, method and apparatus having a flexible drive scheme that allows for real time parameter changes and enables higher bit depth at higher frame rates.

Embodiments of the disclosure combine the ability to change pixel drive currents, simultaneously for the entire display and in real time, in the course of an image frame with a flexible sequence of bit planes of varying time duration (i.e., varying the pixel drive currents between bit planes of a single image frame. By adding an extra variable to be controlled by the system, such as current for LEDs, or voltage for Liquid Crystal on Silicon (LCoS), both time and current/voltage may be used to alter the intensity value represented by any grayscale value and/or any portion of the drive waveform, which accordingly can change the brightness of the pixel driven by the drive waveform. Thus, in accordance with embodiments of present disclosure, a flexible drive system, in accordance with the present disclosure, may combine two variables, such as time and current, or time and voltage and apply them in combination to represent intensity levels and may change these parameters (i.e., the time, voltage, and current) in real time and synchronously, such that a display in accordance with embodiments of the present disclosure achieves greater bit-depth (color/intensity precision) without having to use as much time to display each frame of information, thus allowing for either greater precision at the same frame rate, or faster frame rate at the same precision, as compared to prior-art systems.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The present disclosure is illustrated and described herein with reference to the various drawings, in which like reference numbers are used to denote like system components, as appropriate, and in which:

FIG. 1b illustrates a microLED display system incorporating the display system of FIG. 1a.

FIG. 1c illustrates a LCOS display system incorporating the display system of FIG. 1a.

FIG. 3 illustrates a drive waveform resulting from a method of operating of a display system in accordance with an embodiment of the present disclosure.

DETAILED DESCRIPTION OF THE DISCLOSURE

Figure 1A:
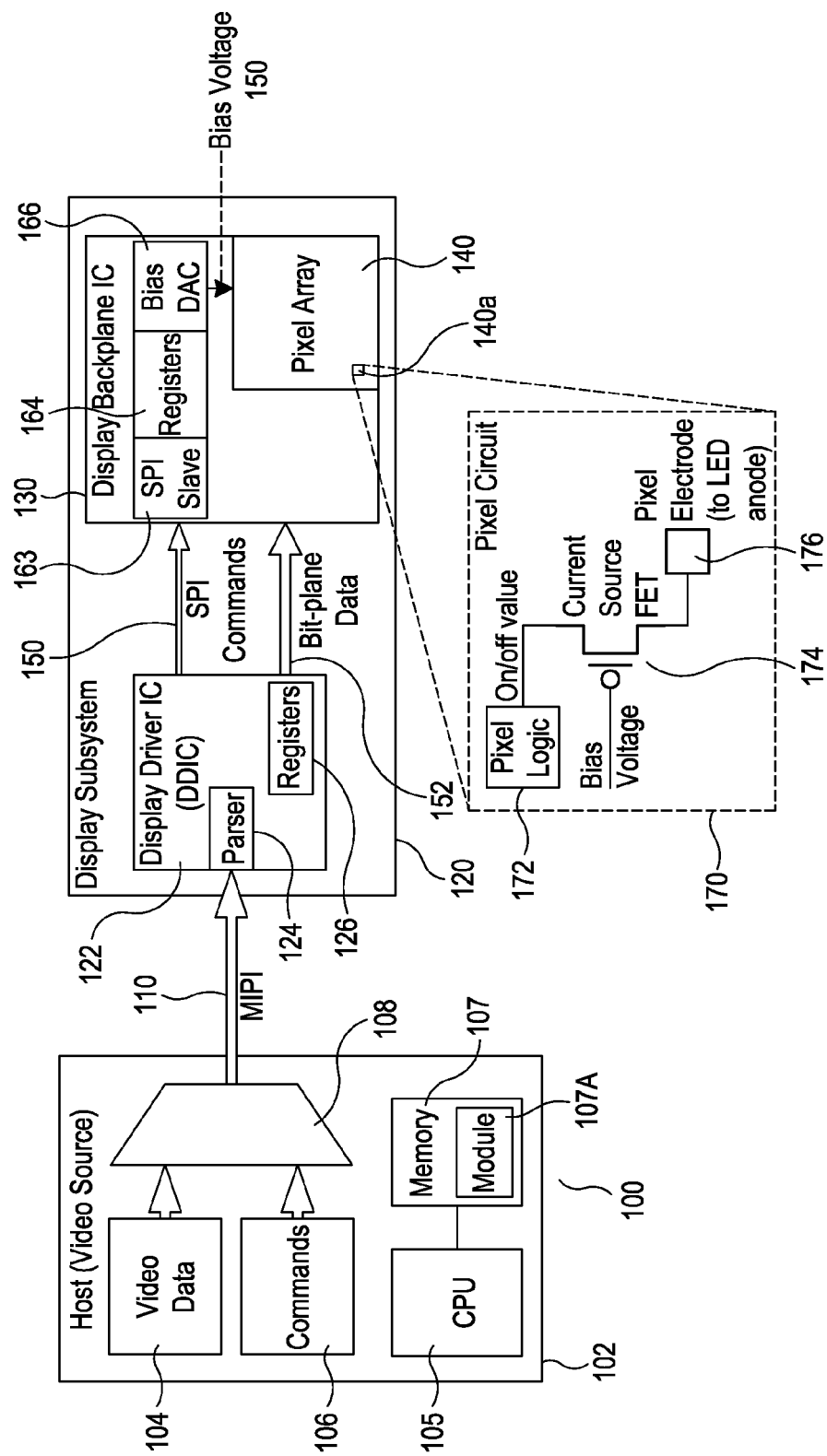
FIG. 1a illustrates a block diagram of a display system in accordance with an embodiment of the present disclosure.

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

FIG. 1 illustrates a display system 100 in accordance with an embodiment of the present disclosure. As illustrated in FIG. 1a, a data source 102, for example, an image, image data or video source or video data 104, such as a host. In an embodiment of the present disclosure, the host may include a processor 105, for example, an application processor, that executes applications, instructions, or commands 106 (e.g., software) stored in a storage device (for example, a memory device 107) of the host. In an embodiment of the present disclosure, the host may stream image data or images, for example video data.

In an embodiment of the present disclosure, the data source or host may be, for example, a mobile device, such as smartphone, tablet, laptop, head-up display system, head mounted device, or hybrid device (or some combination of the aforementioned). In an embodiment of the present disclosure, the image, image data, and/or video data is received by the real time data software module 107a and/or a MUX 108 of the host 102, and the real time data software or software module 107a combines the data with the commands parsed from a master sequence file containing a desired drive sequence at the multiplexer (MUX) 108 and/or real time data software module 107a. Additionally or alternatively the MUX 108 could be hardware that is controlled from the real-time data software module 107a In an embodiment of the present disclosure, the data combined with the commands is combined data that is output from the data source (e.g., the host) 102 and transmitted to the display subsystem. In an embodiment of the present disclosure the combined data is output via a real time data software module 107a and/or MUX 108 of the data source 102.

In an embodiment of the present disclosure, the combined data is streamed or transmitted to a parser logic software module or software 124 in a display driver IC 120 or display driver circuitry 122 of a display subsystem 120 via a communications transmission device, data transmission device, and/or protocol 110. In an embodiment of the present disclosure, the display driver circuitry may be incorporated into an IC (e.g., DDIC 122). In an embodiment of the present disclosure the communications transmission device and/or protocol is MIPI controller and/or MIPI protocol 110. In an embodiment of the present disclosure, the combined data is transmitted to a MIPI controller that uses a MIPI PHY (physical layer) to transmit the data to the display subsystem 120. In an embodiment of the present disclosure, the combined data is transmitted to the parser 124 of the Display Driver IC 122. In an embodiment of the present disclosure, the combined data is transmitted to the Display Driver IC 122.

In an embodiment of the present disclosure the display subsystem 120 may be an microLED display subsystem that includes display driver circuitry, a display that includes a display backplane 130 with backplane circuitry integrated or electrically connected or coupled to it, and a pixel array 140 (e.g., a pixel array of pixel elements such as an LED pixel array (e.g., a microLED pixel array)). In an embodiment of the present disclosure, the LED pixel array (e.g., a microLED pixel array) is not included in the display backplane IC 130 or subsystem 120.

In an embodiment of the present disclosure, the display subsystem may be a liquid crystal on silicon (LCoS) display subsystem that includes display driver circuitry, a display device that includes a liquid crystal material or substance and a backplane with backplane circuitry integrated or electrically connected or coupled to it, and a pixel array (e.g., a pixel array of pixel elements such as pixel array of reflective devices (e.g., an array of mirror elements/devices that when charged operate to control the position of liquid crystal in the display device)). In an embodiment of the present disclosure, the pixel array of reflective devices is not included in the display backplane IC 130 or subsystem 120.

In an embodiment of the present disclosure, the display driver circuitry is internal to the display subsystem or electrically coupled to the display. In an embodiment of the present disclosure, at least some of the display driver circuitry may be incorporated into a display driver integrated circuit (DDIC) 122. In an embodiment of the present disclosure, the parser 124 may be included, incorporated, and/or integrated into the DDIC 122.

In an embodiment of the present disclosure, the display driver circuitry or subsystem 120 receives the combined data from the communications and data transmission device or system 110, and converts the combined data into Serial Peripheral Interface (SPI) commands 150 and bit plane data 152. In an embodiment of the present disclosure, the parser 124 receives the combined data, parses and/or separates the combined data into command and image data. Other logic within the DDIC 122 can then convert the image data into bit plane data. This bit plane data may then be output to the display backplane 130. In an embodiment of the present disclosure the parser 124 and/or the DDIC parses and/or converts the combined data into (SPI) commands 150 and bit plane data 152 that is outputted to the display backplane 130. In an embodiment of the present disclosure, the Driver IC 122 or an SPI slave 163 of the Display Backplane IC 130 receives the SPI commands. In an embodiment of the present disclosure, the Display Backplane IC 122 includes the SPI Slave 163, one or more storage devices 164 (e.g., registers), bias DAC 166, display backplane logic (e.g., pixel logic 172) and circuitry (e.g., 174) and optionally pixel electrode 176.

In an embodiment of the present disclosure the SPI commands 150 are commands that write to internal registers or memories. In an embodiment of the present disclosure the bit plane data 152 is data that determines or controls the intensity or brightness of a pixel, when presented to the pixel array sequentially and may be arranged in words representing data to be distributed to a series of pixels in rows or columns or rectangular sub-areas of the pixel array 140 or display. It should be understood by one of ordinary skill in the art that the bit depth may vary, but is typically between 6 and 10 bits, and more typically 8 bits.

Figure 1C:
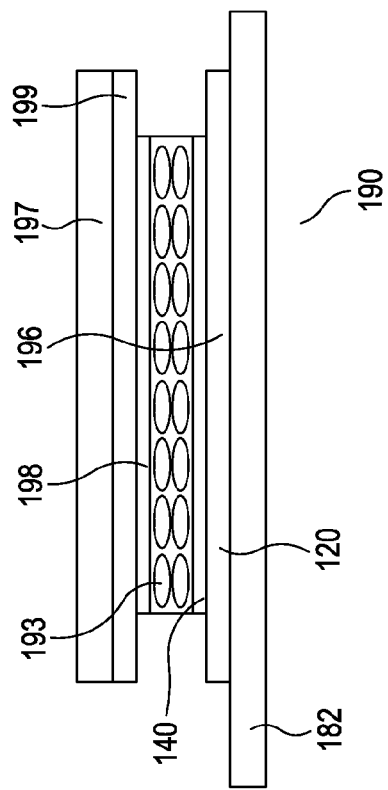
Figure 1B:
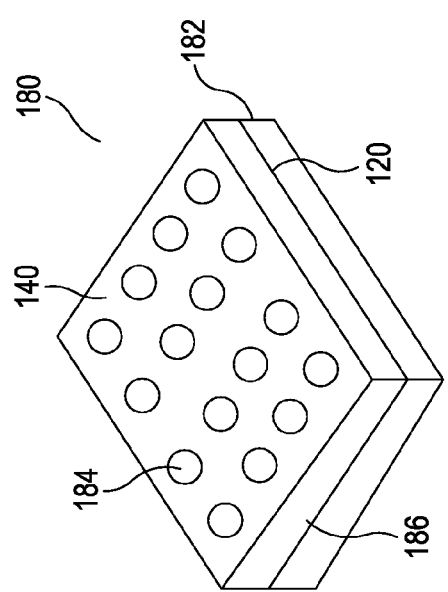

FIG. 1b is an illustration of a microLED display system 180 which, in an embodiment, may include the display system 100 of the present disclosure. The microLED display system 180 typically includes a pixel array 140 of individual pixel LED elements 184 arranged on a substrate 182.

Similarly, FIG. 1c is an illustration of a LCOS display system 190 having similar elements and which, in an embodiment, may also include the display system 100 of an embodiment of the present disclosure. In particular, a substrate 182 on which a display backplane 120 may be coupled to or integrated with, is provided. The substrate 182 may be silicon. Reflective devices or layers 196, which may be aluminum layers have pixel array (s) 140 arranged thereon, coupled or integrated with the display backplane 120. A liquid crystal layer 193, alignment layer 198, transparent electrodes (typically within an Indium Tin Oxide layer) 199 and a glass or other transparent material layer 197 forming a display complete the structure. In embodiments such LCOS display may comprise a series of individual square elements.

In an embodiment of the present disclosure, a display backplane IC 130 may be included in, incorporated into, or integrated into a display backplane 120 (which may be coupled to, for example, reflective devices 186; 196 in the LCOS display system or LEDs such as microLEDs in a microLED display system). The pixel array (i.e., the microLEDs or LEDs) can be on its own substrate, with each LED coupled to a pixel driver on the backplate. In an embodiment of the present disclosure, the display backplane 120 is coupled to a display device 180, 190 (e.g., an LCOS device) or LCOS pixel array 140 or pixel elements (e.g., reflective devices 186; 196 or LEDs or array of LEDs, for example, microLEDs). In an embodiment of the present disclosure, a display device 100 includes a display backplane 120, display backplane circuitry 130, pixel circuitry 174 (e.g., as pixel drive circuitry or pixel circuit), and pixel elements 140a that are coupled (e.g., electrically) to, integrated into, included in and/or positioned in the DDIC 122. In an embodiment of the present disclosure, a display device 100 (including the DDIC 122) is electrically coupled to a DDIC, and form the display subsystem 120 and are assembled together in a display module 100.

In an embodiment of the present disclosure the display subsystem 120 includes a display 197. In an embodiment of the present disclosure (such as shown in FIG. 1c), the display 197 is an array of pixel elements 140 arranged on the backplane 120 or coupled to backplane circuitry (e.g., pixel circuitry 170, pixel drive circuitry or drive circuitry incorporated, coupled to, or integrated into the backplane). In an embodiment of the present disclosure the display subsystem 120 is a liquid crystal-on-silicon (LCoS) display subsystem of an LCoS display system 190. In an embodiment of an LCoS system 190, in accordance with embodiments of the present disclosure, the display 197 is a liquid crystal display or liquid crystal cell (including liquid crystal 193 placed between two substrates 196, 199, is electrically coupled to or integrated with a backplane 120 or backplane IC of the display subsystem. In an embodiment of the present disclosure, one of the substrates 196 of the liquid crystal display or cell is the backplane 120 or backplane IC. In an embodiment of the present disclosure, the liquid crystal display or liquid crystal cell 193 is included, electrically coupled to, or integrated into Display Backplane integrated circuit 130 (IC) or substrate thereof. In an embodiment of the present disclosure, the Display Backplane IC 130 is electrically coupled to one of the sides of the Liquid Crystal cell, for example, a side of the display that does not emit light or the light that corresponds to an image. In an embodiment of the present disclosure, the liquid crystal cell is coupled to a silicon substrate 182, and that substrate is the same silicon substrate that forms one side of the Display Backplane IC 120 or is a silicon substrate coupled to a substrate of the Display Backplane IC (e.g., a substrate, such as a silicon substrate that includes drive circuitry, pixel circuitry, pixel circuits 170, and/or drive circuits 166).

In an embodiment of the present disclosure (such as shown in FIG. 1b), the display subsystem 120 is a microLED display subsystem 180. In an embodiment of the present disclosure the display subsystem 100 is of a microLED system 180. In an embodiment of a micro-LED subsystem 180 in accordance with an embodiment of the present disclosure, the display is an array of LEDs 184 or microLEDS that is electrically coupled to or integrated into or with a backplane 120 or display backplane IC of the display subsystem 100. In an embodiment of the present disclosure, the array of microLEDs 184 is included, electrically coupled to, or integrated into the Display Backplane integrated circuit (IC) 122 and/or substrate thereof 182. In an embodiment of the present disclosure, the Display Backplane IC 122 is electrically coupled to one of the sides of the array of LEDs (e.g., microLEDs), for example, a side of the array of LEDs (e.g., microLEDs) that does not emit light or the light that corresponds to an image. In an embodiment of the present disclosure, the array of LEDs 184 (e.g., microLEDs) is coupled to a silicon substrate 182, and that substrate is the same silicon substrate that forms one side of the Display Backplane IC 122 or is a silicon substrate 182 coupled to a substrate 186 of the Display Backplane IC 122 (e.g., a silicon substrate of the Display Backplane IC).

In an embodiment of the present disclosure, the array of pixels 184 include pixel elements assembled in an array 140, or assembled on a substrate 182 in an array. In an embodiment of the present disclosure, the array of pixels 180 is an array of light emitting diodes (LEDs). In an embodiment of the present disclosure the LEDs may be microLEDs. In an embodiment of the present disclosure, the array of pixel elements 184; 140 is an array of reflective elements 196 that control the birefringence of the liquid crystal 193 in an LCOS device 190 or other liquid crystal device. In an embodiment of the present disclosure, the pixel elements 184 are reflective elements/devices, for example, mirrors. In an embodiment of the present disclosure, the pixel array 140 or array of pixels is formed in, coupled to, incorporated in, or integrated into the display backplane IC 122. In an embodiment of the present disclosure, the DDIC or display driver circuitry drives the operation of pixel elements (e.g., light emitting diodes (LEDs), microLEDs 184, reflective elements) of an array of pixel elements arranged on a backplane 120 of the display subsystem 100.

In an embodiment of the present disclosure, the display subsystem 100 may also include an SPI slave or receiver 163 for an alternate protocol such as I2C or a custom protocol, registers 164, and a digital to analog converter (DAC) (e.g., a bias DAC) 166. In an embodiment of the present disclosure, the SPI slave, registers, and a digital to analog converter (DAC) (e.g., a bias DAC) are formed in, coupled to, incorporated in, or integrated into display driver circuitry, display backplane circuitry and/or a display backplane IC.

In an embodiment of the present disclosure the SPI slave 163 is electrically coupled to one or more registers 164, via, for example, an internal parallel bus and write strobe. In an embodiment of the present disclosure the registers are electrically coupled to the DAC (e.g., the Bias DAC) 166 via, for example, a 6- or 8-bit DAC designed to provide voltages suitable for biasing the current sources in the pixel array. In an embodiment of the present disclosure, the DAC (e.g., the Bias DAC) is electrically coupled to the Pixel Array via for example, a Vref signal. In an embodiment of the present disclosure, the SPI slave receives SPI commands from the parser, DDIC, and/or display driver circuitry, and generates parallel data and a write strobe that is output to the one or more registers. In an embodiment of the present disclosure, the one or more registers receive the data and stores a value that is output to the DAC continuously. In an embodiment of the present disclosure, the DAC (e.g., the Bias DAC) receives a binary value from the one or more registers, and converts that value to a voltage and outputs that voltage to at least a portion of the pixel array continuously.

In an embodiment of the present disclosure, at least some of the pixel elements 140a are coupled to pixel circuitry 170. In an embodiment of the present disclosure each of the pixels or each of the pixel elements utilized, or available for utilization is electrically coupled to or integrated with a pixel circuit. For example, the pixel circuit shown in FIG. 1 illustrates that the bias voltage applied to each pixel or pixel element in the array or each pixel or pixel element in the array available for utilization. In an embodiment of the present disclosure a pixel includes a pixel element (e.g., an LED, microLED, or reflective device) and a pixel circuit.

In an embodiment of the present disclosure, each pixel circuit 170 includes pixel logic circuitry 172 connected to at least one transistor 174 and a pixel electrode 176. In an embodiment of the present disclosure, the pixel logic includes logic elements (e.g., one or more logic gates or combinatorial logic circuits) that generate a digital output or value (e.g., an on or off value, or one or zero value) that is output to one end of the transistor to which it is coupled. In an embodiment of the present disclosure, the transistor is a field effect transistor (FET). In an embodiment of the present disclosure, the transistor is electrically coupled to a voltage source or the DAC (e.g., the Bias DAC). In an embodiment of the present disclosure, the other end of the transistor is electrically coupled to a pixel electrode 176 or pixel element. In an embodiment of the present disclosure, the pixel electrode is electrically coupled to the pixel element, for example, an LED, or microLED. A reference to an LED for purposes of this disclosure is also a reference to a microLED. In an embodiment of the present disclosure, the display subsystem 120 is a microLED display subsystem, and the transistor 174 is a FET. In an embodiment of the present disclosure, the FET drives the micro-LED display, and is electrically coupled (for example, via electrical wire/wireline), directly or indirectly (for example, via a pixel electrode 176), to a pixel element 140a (e.g., a microLED) and serves as a current source to the pixel element. In an embodiment of the present disclosure, a means for an on/off control of the pixel element 140a is coupled, directly or indirectly, to the source terminal of the FET 174. In an embodiment of the present disclosure, the output of pixel logic is the on/off control or activation/deactivation means for the pixel element, and is connected to the source terminal of the FET 174. In an embodiment of the present disclosure, a bias voltage is received at the FET's gate terminal from, for example, a DAC 166 (e.g., a central bias voltage DAC) that is electrically coupled to the gate terminal of the FET 174. In an embodiment of the present disclosure, the use of the DAC enables fine (multi-valued vs. on/off, for instance 6- or 8-bit precision) control of the drive current.

Figure 2:
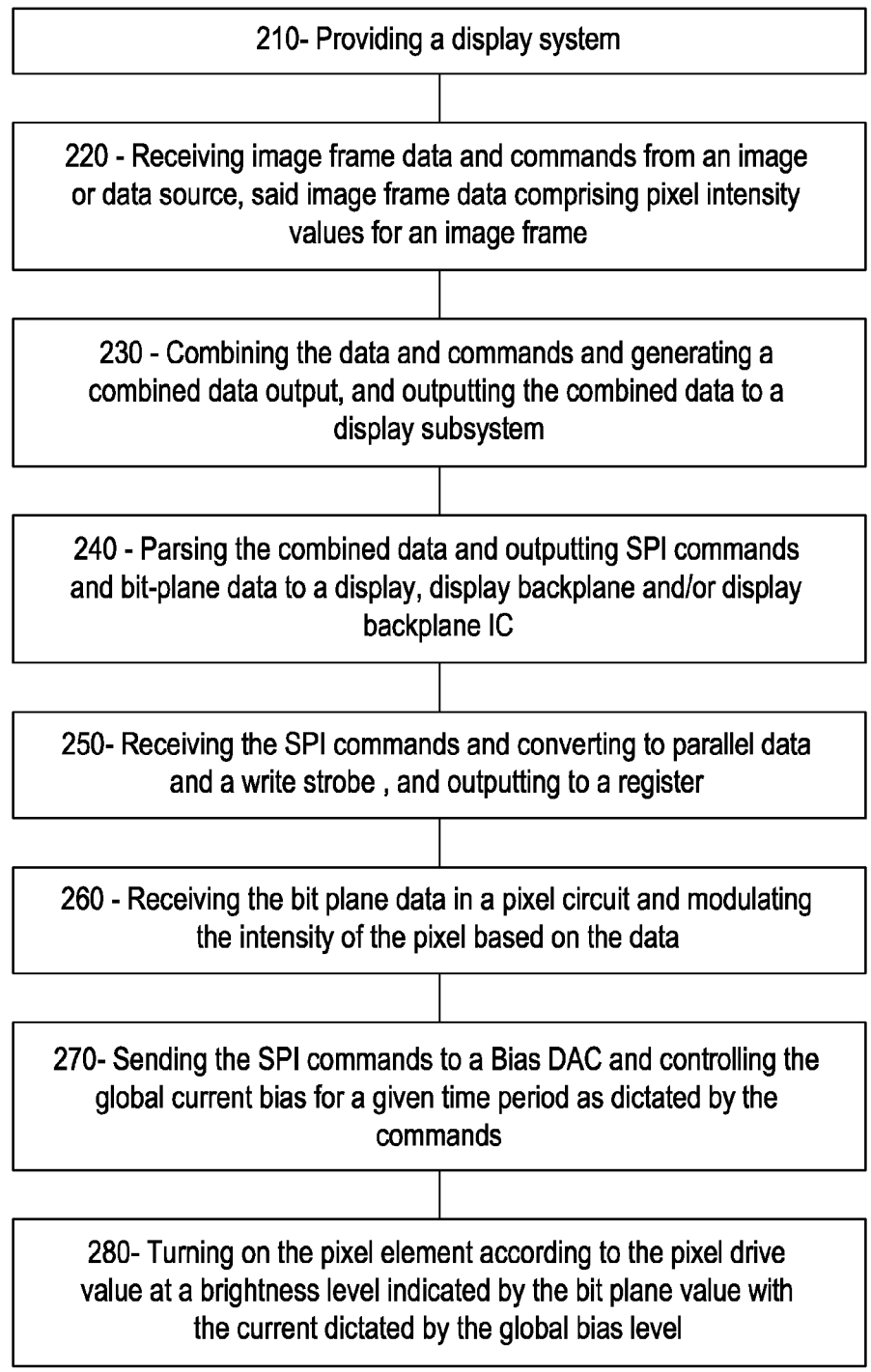
FIG. 2 illustrates a flow chart of a method of operating a display system in accordance with embodiments of the present disclosure.

A method 200 of operation of a display system 100, in accordance with embodiments of the present disclosure, is described as illustrated in FIG. 2. The method may involve, in an embodiment of a method of operating a display system, a step of providing a display system 100. In accordance embodiments of the present disclosure, a subsequent step 220 may involve receiving image frame data and commands from an image data source 120. The image frame data may be received at a real time data software module 107a and/or MUX 108 that receives data 194 and/or commands 106. In an embodiment of the present disclosure, the image frame data may be, for example, an image, image data, video, or video data 104 received from memory 107 in the host 102. In an embodiment the commands 106 are commands that initiate the writing of bit-plane data to the pixel driver array or command which update a register value, such as the bias DAC input data word. In an embodiment of the present disclosure, the real time data software module 107a and/or MUX 108 resides on a storage device (e.g., a memory device 107) in the data source 102 or host. In an embodiment of the present disclosure, the data source 102 is coupled to a processor 105. The processor 105 executes the instructions of the real time data software or module 107a and/or MUX 108. In an embodiment of the present disclosure, the data source 102 is a host device that includes a processor 105 that executes the instructions of the real time data software or module 107a and/or MUX 108. In an embodiment of the present disclosure, the real time data software or module 107a and/or MUX 108 combines the data and commands and generates a combined data output in step 230 and outputs the combined data to the display subsystem. By adding the commands 106 to the image or video data 104 (or combining the commands with the video data) at a MUX 108, real time data software module 107a, or the like, the application of the commands 106 becomes delivered in real time with the image or video data 104. In an embodiment of the present disclosure, the combined data output is transmitted to the display subsystem via a data communications device, interface device, and/or communications protocol (e.g., a MIPI interface) 110, which is electrically coupled to the data source 102 and the display subsystem 120, display driver circuitry 122, and/or display driver IC, and may be internal or external to the display subsystem 120.

In step 240, a parser 124 receives the combined data and parses the combined data, and outputs SPI commands 150 and image data which is translated into image data which is translated into bit-plane data 152 via logic in the DDIC 122, and sent to the display backplane, and/or display backplane IC 130, at the same time or different times (e.g., different times in a same time period such as a frame or subframe). In an embodiment the display subsystem 120 or system in accordance with embodiments of the present disclosure may, at step 240, use the parser 240 (which may be internal or external to the display driver IC) to parses the incoming data 110 (e.g., bit-plane data) and commands (e.g., commands) then separates and formats and/or converts the incoming data (e.g., bit-plane data) and commands into: 1) bit-plane data 152 (i.e., data that contains the on/off state of at least some of the pixels of the display backplane IC for a given time interval of the video frame); 2) local register 126 configurations which control the parameters of the bit-plane formatting operation that is performed by the display driver logic and backplane 130 in combination, for example, time durations employed for mapping various bits of bit-groups of the incoming video data in the DDIC, by converting the collection of mult-bit grayscale values received into a series of n bit planes, each one carrying the nth bit of the grayscale value for all the pixels in the pixel array); and 3) commands 150 destined for the SPI connection to the display backplane IC 130. This series of operations, in step 240, constitutes the mechanism or means for delivering on-the-fly parameter changes which enables the use of both time durations and analog drive values, corresponding to intensities when taken together, to make a drive waveform 150.

In step 250, the SPI slave 163 receives the SPI commands 150 and converts them to parallel data and a write strobe and then sends or outputs the data and strobe to the registers 164. In step 260, one or more of the pixel circuits 170 receives the bit plane data (e.g., instantaneous brightness or intensity values for each pixel of the display and modulates its output, controlling the intensity of the pixel.

In step 270 the SPI commands 150 stored in the registers 164 are output or sent to the DAC 166, for example, a Bias DAC, when a new pixel drive value Vref 152 (i.e., a bias voltage or drive current) has been written to the registers 164 from the parser 124. In an embodiment of the present disclosure, the new value is or may be written to the register 164 when or upon the occurrence of an update command received via SPI commands 150.

In an embodiment of the present disclosure, in the parser 124 (which may be internal or external to the backplane IC 130), receives commands (such as a change to the global current bias DAC input word), decodes the commands 106, and transmits SPI commands to the SPI slave 163. In an embodiment of the present disclosure, the SPI slave 163 is included in or integrated with, or coupled to the backplane IC 130, and when SPI commands 150 are received, and stored into registers 164, if needed, and the parser 124 outputs bit plane data 152 that is loaded sequentially into the pixel array 140 to control the state of each pixel 140a for a given time period when dictated by the master drive sequence stored in the Driver IC 122 or driver logic.

In step 890 the bias voltage in conjunction with the output of the pixel logic determine when current flows to the pixel electrode 176, which is electrically coupled to a pixel element 140a, (e.g., an LED, microLED, or reflective mirrored surface) or directly to the pixel element, such that the pixel element 140a is turned on or off (i.e., activated or deactivated). In an embodiment of the present disclosure, In step 290 the bias voltage in conjunction with the output of the pixel logic determine when current flows to the pixel electrode 176, which is electrically coupled to a pixel element 140a, (e.g., an LED, microLED, or reflective mirrored surface) or directly to the pixel element, such that the pixel element is turned on (i.e., activated) and emits light of a level of brightness represented by a bit plane value of the bit plane data that was received at the respective pixel element. In an embodiment of the present disclosure, the total light output from a display system 100 in accordance with embodiments of the present disclosure, for example, over a video frame for each pixel 140a is the sum of the products of the current value and on/off state, of each pixel (or zone of pixels) for each time interval programmed.

FIG. 3 illustrates a drive waveform yielded in accordance with an embodiment of the present disclosure. Biasing of the pixel array via a command that is transmitted with the incoming video data, in accordance with the steps of FIG. 2, implemented by the system in FIG. 1, yields the drive waveform illustrated in FIG. 3. The drive sequence shown in FIG. 3 consists of update time intervals (where a new DAC Control word is transmitted to and stored in the registers of the backplane IC) and driving time intervals, shown as multiple "current zones" where a programmable amount of time is spent driving at a certain current level. The drive waveform for each pixel or a selection of pixels of the pixel array may be transmitted as commands to the display backplane IC 130.

The embodiments here have a number of benefits and advantages. The embodiments herein overcome the limitations of analog systems that either merely change the current and leave the pixel powered on all the time, or digital drive would just have binary on/off states. An embodiment of the present disclosure provides a system in which both the current and voltage parameters may be controlled simultaneously for a given period of time for how long you leave the current on the pixel, due to the flexible programmability of the format, a variety of different mapping schemes are possible and customizable.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A display system for driving pixels of a pixel array comprising:
   a display subsystem comprising:
      display driver circuitry for:
         receiving image frame data and commands, the image frame data comprising pixel intensity or brightness values for an image frame or subframe;
         processing the image frame data and the commands to determine, for at least one pixel of the pixel array, a pixel drive value and a pixel drive time interval for each bit plane of a plurality of bit planes, the pixel drive value and pixel drive time interval for each bit plane defining a drive waveform; and
         generating a command corresponding to the drive waveform; and
   a display backplane to receive the command corresponding to the drive waveform, the display backplane comprising:
      pixel driver circuitry comprising a pixel circuit for each pixel of the pixel array, each pixel circuit comprising pixel logic circuitry connected to at least one transistor connected to a pixel electrode, the pixel logic circuitry comprising logic elements that generate, in response to the command corresponding to the drive waveform, a digital value output to the at least one transistor to activate or deactivate a current into the pixel electrode,
      such that the pixel driver circuitry drives the at least one pixel in accordance with the drive waveform such that an intensity or brightness of the at least one pixel varies for each bit plane according to the corresponding pixel drive value and the corresponding pixel drive time interval, the pixel drive value comprising a pixel drive voltage or a pixel drive current.

2. The display system of claim 1, wherein the display subsystem further comprises a digital to analog converter driven by a register for converting a digital control word into a bias voltage to control a drive current of the pixel driver circuitry for all pixels.

3. The display system of claim 2, wherein the display backplane includes circuitry that provides both bit plane digital data and the bias voltage to the pixel driver circuitry for driving all pixels of the pixel array.

4. The display system of claim 1, wherein the display subsystem further comprises a sequence memory for storing one or more programmable mappings that modify at least one of the pixel drive value and the pixel drive time interval based on at least one of: desired performance, ambient lighting compensation, or temperature compensation.

5. The display system of claim 4, wherein the display driver circuitry converts at least one of the pixel drive values or the pixel drive time intervals of the image data according to the programmable mappings.

6. The display system of claim 1, wherein the image frame comprises a sequence of frame zones, each frame zone comprising a plurality of bit planes, and each frame zone having a different global bias and therefore a different intensity value.

7. The display system of claim 1, wherein the image frame data is received from an image or video data source comprising one or more of an image, image data, or a video source.

8. The display system of claim 1, wherein the image frame data is received from a host, said host comprising a processor that executes applications stored on or streamed to the host.

9. The display system of claim 1, wherein:

the pixels comprise light emitting diodes; and the pixel drive values comprise pixel drive currents.

10. The display system of claim 9, wherein:

the pixels comprise liquid crystal on silicon; and the pixel drive values comprise voltages.

11. The display system of claim 1, wherein at least one of the display backplane or the display driver circuitry is an integrated circuit.

12. The display system of claim 1, wherein the at least one transistor is electrically coupled to a voltage source, or a digital to analog converter and the pixel electrode, and wherein the at least one transistor is a field effect transistor.

13. The display system of claim 12, wherein the at least one transistor receives a bias voltage from the voltage source or to a digital to analog converter output and provides a drive current to pixel electrode with fine control.

14. A method of driving pixels of a pixel array, each pixel of the pixel array being connected to pixel driver circuitry comprising a pixel circuit, each pixel circuit comprising pixel logic circuitry connected to at least one transistor connected to a pixel electrode, said method comprising:

receiving image frame data and commands, said image frame data comprising pixel intensity or brightness values for an image frame or subframe;

processing the image frame data and the commands to determine, for at least one pixel of the pixel array, a pixel drive value and a pixel drive time interval for each bit plane of a plurality of bit planes, the pixel drive value and pixel drive time interval for each bit plane defining a drive waveform;

generating a command corresponding to the drive waveform;

in response to the command corresponding to the drive waveform, generating, by the pixel logic circuitry of the pixel driver circuitry connected to the at least one pixel, a digital value output to the at least one transistor to activate or deactivate a current into the pixel electrode; and driving, by the pixel driver circuitry, the at least one pixel in accordance with the drive waveform such that an intensity or brightness of the at least one pixel varies for each bit plane according to the corresponding pixel drive value and the corresponding pixel drive time interval, the pixel drive value comprising a pixel drive voltage or a pixel drive current.

15. A display subsystem for driving pixels of a pixel array, comprising:

display driver circuitry for:

receiving image frame data and commands, said image frame data comprising pixel intensity or brightness values for an image frame or subframe;

processing the image frame data and the commands to determine, for at least one pixel of the pixel array, a pixel drive value and a pixel drive time interval for each bit plane of a plurality of bit planes, the pixel drive value and pixel drive time interval for each bit plane defining a drive waveform; and generating a command corresponding to the drive waveform; and a display backplane to receive the command corresponding to the drive waveform, the display backplane comprising:

pixel driver circuitry comprising a pixel circuit for each pixel of the pixel array, each pixel circuit comprising pixel logic circuitry connected to at least one transistor connected to a pixel electrode, the pixel logic circuitry comprising logic elements that generate, in response to the command corresponding to the drive waveform, a digital value output to the at least one transistor to activate or deactivate a current into the pixel electrode, such that the pixel driver circuitry drives the at least one pixel in accordance with the drive waveform such that an intensity or brightness of the at least one pixel varies for each bit plane according to the corresponding pixel drive value and the corresponding pixel drive time interval, the pixel drive value comprising a pixel drive voltage or a pixel drive current.

16. The display subsystem of claim 15, wherein the display subsystem further comprises a digital to analog converter driven by a register for converting a digital control word into a bias voltage to control a drive current of the pixel driver circuitry for all pixels.

17. The display subsystem of claim 16, wherein the display backplane includes circuitry that provides both bit plane digital data and the bias voltage to the pixel driver circuitry for driving all pixels of the pixel array.

18. The display subsystem of claim 15, further comprising a sequence memory for storing one or more programmable mappings that modify at least one of the pixel drive value and the pixel drive time interval based on at least one of: desired performance, ambient lighting compensation, or temperature compensation.

19. The display subsystem of claim 18, wherein the display driver circuitry converts at least one of the pixel drive values or the pixel drive time intervals of the image data according to the programmable mappings.

20. The display subsystem of claim 15, wherein the image frame comprises a sequence of frame zones, each frame zone comprising a plurality of bit planes, and each frame zone having a different global bias and therefore a different intensity value.

* * * * *